(12) United States Patent  
Gwak

(10) Patent No.: US 9,413,940 B2  
(45) Date of Patent: Aug. 9, 2016

(54) DIGITAL ELECTRONIC APPARATUS AND METHOD OF CONTROLLING CONTINUOUS PHOTOGRAPHING THEREOF

(71) Applicant: SAMSUNG ELECTRONICS CO., LTD., Suwon-si, Gyeonggi-do (KR)

(72) Inventor: Jin-pyo Gwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/358,401

(22) PCT Filed: Nov. 6, 2012

(86) PCT No.: PCT/KR2012/009287  
§ 371 (c)(1),  
(2) Date: May 15, 2014

(87) PCT Pub. No.: WO2013/073791  
PCT Pub. Date: May 23, 2013

(65) Prior Publication Data  
US 2014/0300774 A1  Oct. 9, 2014

(30) Foreign Application Priority Data

Nov. 18, 2011  (KR) .................. 10-2011-0121194

(51) Int. Cl.  
*H04N 5/232* (2006.01)  
*H04N 5/91* (2006.01)  
(Continued)

(52) U.S. Cl.  
CPC ............... *H04N 5/232* (2013.01); *H04N 1/215* (2013.01); *H04N 1/2141* (2013.01); *H04N 5/2625* (2013.01); *H04N 5/772* (2013.01); *H04N 5/91* (2013.01); *H04N 21/4184* (2013.01);  
(Continued)

(58) Field of Classification Search  
CPC . H04N 1/2116; H04N 1/2129; H04N 1/2133; H04N 1/2137; H04N 1/2141; H04N 1/2145; H04N 1/215; H04N 5/23245; H04N 5/2625; H04N 2201/218  
See application file for complete search history.

(56) References Cited

U.S. PATENT DOCUMENTS 8,041,207 B2  10/2011  Sasaki et al.  
8,564,614 B2  10/2013  Muraki et al.  
(Continued)

FOREIGN PATENT DOCUMENTS

JP  2005-136855 A  5/2005  
KR  10-2010-0082303 A  7/2010  
(Continued)

OTHER PUBLICATIONS

International Search Report and Written Opinion issued for PCT/KR2012/009287 (Feb. 22, 2013).

*Primary Examiner* — Timothy J Henn  
(74) *Attorney, Agent, or Firm* — Drinker Biddle & Reath LLP

(57) ABSTRACT

A digital electronic apparatus and a method of controlling continuous photographing performed by the digital photographing apparatus are provided. According to the method of controlling continuous photographing performed by the digital photographing apparatus of the invention, continuous photographing can be achieved according to a user's intention without causing inconvenience for a user during continuous photographing, and a desired event can be photographed from its start to end rather than during a precisely given interval.

21 Claims, 11 Drawing Sheets

(51) Int. Cl.
*H04N 1/21* (2006.01)
*H04N 21/81* (2011.01)
*H04N 5/262* (2006.01)
*H04N 21/4223* (2011.01)
*H04N 21/418* (2011.01)
*H04N 5/77* (2006.01)
*H04N 5/907* (2006.01)
*H04N 101/00* (2006.01)

(52) U.S. Cl.
CPC ....... *H04N21/4223* (2013.01); *H04N 21/8153* (2013.01); *H04N 5/23245* (2013.01); *H04N 5/907* (2013.01); *H04N 2101/00* (2013.01); *H04N 2201/218* (2013.01)

(56) References Cited

U.S. PATENT DOCUMENTS

| | | | |
|---|---|---|---|
| 2004/0070679 A1* | 4/2004 | Pope | 348/231.99 |
| 2009/0262218 A1* | 10/2009 | Makii | 348/239 |
| 2010/0304876 A1 | 12/2010 | Hohla et al. | |
| 2011/0050722 A1* | 3/2011 | Muraki et al. | 345/620 |
| 2012/0243802 A1* | 9/2012 | Fintel et al. | 382/284 |
| 2012/0257071 A1* | 10/2012 | Prentice | 348/220.1 |

FOREIGN PATENT DOCUMENTS

| KR | 10-2010-0120982 A | 11/2010 |
|---|---|---|
| KR | 10-2011-0022534 | 3/2011 |

* cited by examiner

| BUFFER | 0 | 1 | 2 | 3 | 4 | 5 | 6 | 7 | 8 | 9 |
|---|---|---|---|---|---|---|---|---|---|---|
| PHOTOGRAPHING INTERVAL | <-t-> | <-t-> | <-t-> | <-t-> | <-t-> | <-t-> | <-t-> | <-t-> | <-t-> | <-t-> |
| PHOTOGRAPHING ORDER | 0 | 1 | 2 | 3 | 4 | 5 | 6 | 7 | 8 | 9 |
| | 10 | 11 | 12 | 13 | 14 | 15 | 16 | 17 | 18 | 19 |

| BUFFER | 0 | 1 | 2 | 3 | 4 | 5 | 6 | 7 | 8 | 9 |
|---|---|---|---|---|---|---|---|---|---|---|
| PHOTOGRAPHING INTERVAL | <-2t-> | <-2t-> | <-2t-> | <-2t-> | <-2t-> | <-2t-> | <-2t-> | <-2t-> | <-2t-> | <-2t-> |
| PHOTOGRAPHING ORDER | 0 | 1✓ | 2 | 3✓ | 4 | 5✓ | 6 | 7✓ | 8 | 9✓ |
|  |  | ⑩ |  | ⑪ |  | ⑫ |  | ⑬ |  | ⑭ |
| SUBSTANTIALLY STORED IMAGES | 0 | 2 | 4 | 6 | 8 | 10 | 11 | 12 | 13 | 14 |

| BUFFER | 0 | 1 | 2 | 3 | 4 | 5 | 6 | 7 | 8 | 9 |
|---|---|---|---|---|---|---|---|---|---|---|
| PHOTOGRAPHING INTERVAL | <-3t-> | <-3t-> | <-3t-> | <-3t-> | <-3t-> | <-3t-> | <-3t-> | <-3t-> | <-3t-> | <-3t-> |
| PHOTOGRAPHING ORDER | 0 | 1 | 2✓ | 3 | 4 | 5 | 6✓ | 7 | 8 | 9 |
|  |  | 10✓ |  | 11 |  | 12✓ |  | 13 |  | 14✓ |
|  |  |  | ⑮ |  |  |  | ⑯ |  |  |  |
|  |  | ⑰ |  |  |  | ⑱ |  |  |  | ⑲ |
| SUBSTANTIALLY STORED IMAGES | 0 | 4 | 8 | 11 | 13 | 15 | 16 | 17 | 18 | 19 |

DIGITAL ELECTRONIC APPARATUS AND METHOD OF CONTROLLING CONTINUOUS PHOTOGRAPHING THEREOF

CROSS-REFERENCE TO RELATED PATENT APPLICATION

This application is a PCT national stage entry application based on PCT Application No. PCT/KR2012/009287, filed Nov. 6, 2012. This application claims the benefit of Korean Patent Application No. 10-2011-0121194, filed on Nov. 18, 2011, in the Korean Intellectual Property Office, the disclosure of both being incorporated herein in their entirety by reference.

BACKGROUND

Disclosed herein is a digital electronic apparatus and a method of controlling continuous photographing performed by the digital photographing apparatus.

Recent digital photographing apparatuses such as digital still cameras (DSCs), digital single-lens reflex (DSLR) cameras, cellular phone cameras, smart phones, etc., provide a continuous photographing function. In this regard, a photographing interval supports continuous photographing according to a performance specification of digital photographing apparatuses, for example, 5 frames per second (fps) for DSLR, 1 fps for compact DSCs, and 10 fps for cameras embedded with complementary metal-oxide-semiconductor (CMOS) image sensors or that support high speed continuous photographing. Such a photographing interval of continuous photographing is determined by a user's previous selection, and cannot be adjusted during photographing.

Furthermore, cameras supporting high speed continuous photographing have difficulties in emphasizing an advantage of continuous photographing since a continuous photographing duration is short due to a size of photographing data. That is, cameras supporting 10 fps at the maximum have a photographing interval of 100 ms or less between frames and enable photographing of 10 images, such cameras have a continuous photographing duration of just 1 second. Here, the photographing continuance time or continuous photographing duration means a time for which continuous photographing is possible. Thus, a desired scene cannot be photographed during continuous photographing for several seconds due to a short continuance time/duration of high speed continuous photographing.

SUMMARY

A digital photographing apparatus and a method of controlling continuous photographing performed by the digital photographing apparatus are provided, in which a subject is continuously photographed according to a user's intention without causing inconvenience for a user during continuous photographing, and a start and end of a desired event are photographed rather than being photographed during a precisely given interval.

According to an embodiment, there is provided a method of controlling continuous photographing performed by a digital photographing apparatus, the method including: photographing a subject during a first photographing interval according to a continuous photographing start signal; storing a plurality of pieces of image data captured during the first photographing interval in a buffer; if a storage space of the buffer is insufficient, deleting a part of the plurality of pieces of image data stored in the buffer according to a predetermined rule; and storing the plurality of pieces of image data stored in the storage space of the buffer from which the part of the image data is deleted until a continuous photographing end signal is detected.

The method may further include: if a storage space of a buffer is insufficient, photographing the subject during a second photographing interval longer than the first photographing interval.

The deleting may include: deleting data of 2n–1th (n is a positive integer) images from the plurality of pieces of image data stored in the buffer.

The deleting may further include: if the storage space of the buffer is smaller than a first threshold, photographing the subject during the second photographing interval that is longer than the first photographing interval; and deleting the 2n–1th (n is a positive integer) image data from the plurality of pieces of image data that are captured during the first photographing interval and the second photographing interval and is stored in the buffer.

The method may further include: storing the plurality of pieces of image data captured during the second photographing interval in the storage space of the buffer from which the part of the image data is deleted.

The method may further include: selecting an event continuous photographing mode in which image data, which is obtained by photographing an event of the subject that occurs from the continuous photographing start signal to the continuous photographing end signal, is stored.

The method may further include: generating one image by performing post processing on the stored plurality of pieces of image data.

The generating may include: extracting image data corresponding to a main subject from the stored plurality of pieces of image data; and generating one continuous photographing image corresponding to the main subject from the extracted image data.

The generating may further include: extracting image data corresponding to a dynamic subject from the stored plurality of pieces of image data; and generating one continuous photographing image corresponding to the dynamic subject from the extracted image data.

According to another embodiment, there is provided a method of controlling continuous photographing performed by a digital photographing apparatus, the method including: photographing a subject during a first photographing interval according to a continuous photographing start signal; sequentially storing a plurality of pieces of image data captured during the first photographing interval in a buffer; if a storage space of the buffer is smaller than a first threshold, photographing the subject during a second photographing interval that is longer than the first photographing interval; sequentially storing a plurality of pieces of image data captured during the second photographing interval; if the storage space of the buffer is insufficient, deleting a part of the plurality of pieces of image data stored in the buffer; and storing the plurality of pieces of image data stored in the storage space of the buffer from which the part of the image data is deleted until a continuous photographing end signal is detected.

The deleting may include: deleting data of 2n–1th (where n is a positive integer) images from the plurality of pieces of image data stored in the buffer.

According to another embodiment, there is provided a digital photographing apparatus including: an imaging device control unit for photographing a subject; a buffer for storing a plurality of pieces of image data; and a control unit for controlling the imaging device control unit to photograph the subject during a first photographing interval according to a continuous photographing start signal, storing a plurality of pieces of image data captured during the first photographing interval in a buffer, if a storage space of the buffer is insufficient, deleting a part of the plurality of pieces of image data stored in the buffer according to a predetermined rule, and storing the plurality of pieces of image data stored in the storage space of the buffer from which the part of the image data is deleted until a continuous photographing end signal is detected.

If a storage space of a buffer is insufficient, the control unit may control the imaging device control unit to photograph the subject during a second photographing interval that is longer than the first photographing interval.

The control unit may control deleting of data of 2n−1th (where n is a positive integer) images from the plurality of pieces of image data stored in the buffer.

If the storage space of the buffer is smaller than a first threshold, the control unit may control the imaging device control unit to photograph the subject during the second photographing interval that is longer than the first photographing interval and delete the 2n−1th (where n is a positive integer) image data from the plurality of pieces of image data that are captured during the first photographing interval and the second photographing interval and is stored in the buffer.

The control unit may control to store the plurality of pieces of image data captured during the second photographing interval in the storage space of the buffer from which the part of the image data is deleted.

The digital photographing apparatus may further include: an event continuous photographing mode selecting unit for storing image data obtained by photographing an event of the subject, which occurs from the continuous photographing start signal to the continuous photographing end signal.

The digital photographing apparatus may further include: a post processing unit for generating one image by performing post processing on the stored plurality of pieces of image data.

The post processing unit may include: a subject extracting unit for extracting image data corresponding to a main subject from the stored plurality of pieces of image data; and an image combining unit for generating one continuous photographing image corresponding to the main subject from the extracted image data.

The post processing unit may include: a subject extracting unit for extracting image data corresponding to a dynamic subject from the stored plurality of pieces of image data; and an image combining unit for generating one continuous photographing image corresponding to the dynamic subject from the extracted image data.

According to another embodiment, there is provided a non-transitory computer readable recording medium storing a program for executing a method of controlling continuous photographing performed by a digital photographing apparatus.

BRIEF DESCRIPTION OF THE DRAWINGS

The above and other features and advantages will become more apparent by describing in detail exemplary embodiments thereof with reference to the attached drawings in which:

FIGS. 6A, 6B, and 6C are image sequence diagrams for comparing the conventional continuous photographing with continuous photographing according to an embodiment;

DETAILED DESCRIPTION

Hereinafter, various embodiments of the invention will be described more fully with reference to the accompanying drawings. A digital camera will now be described as a digital photographing apparatus according to the various embodiments. However, the invention is not limited thereto and can also be applied to digital apparatuses such as a digital camcorder, a smart phone, a personal digital assistant (PDA), and so forth. Embodiments of the invention will now be described in detail with reference to accompanying drawings.

Figure 1:
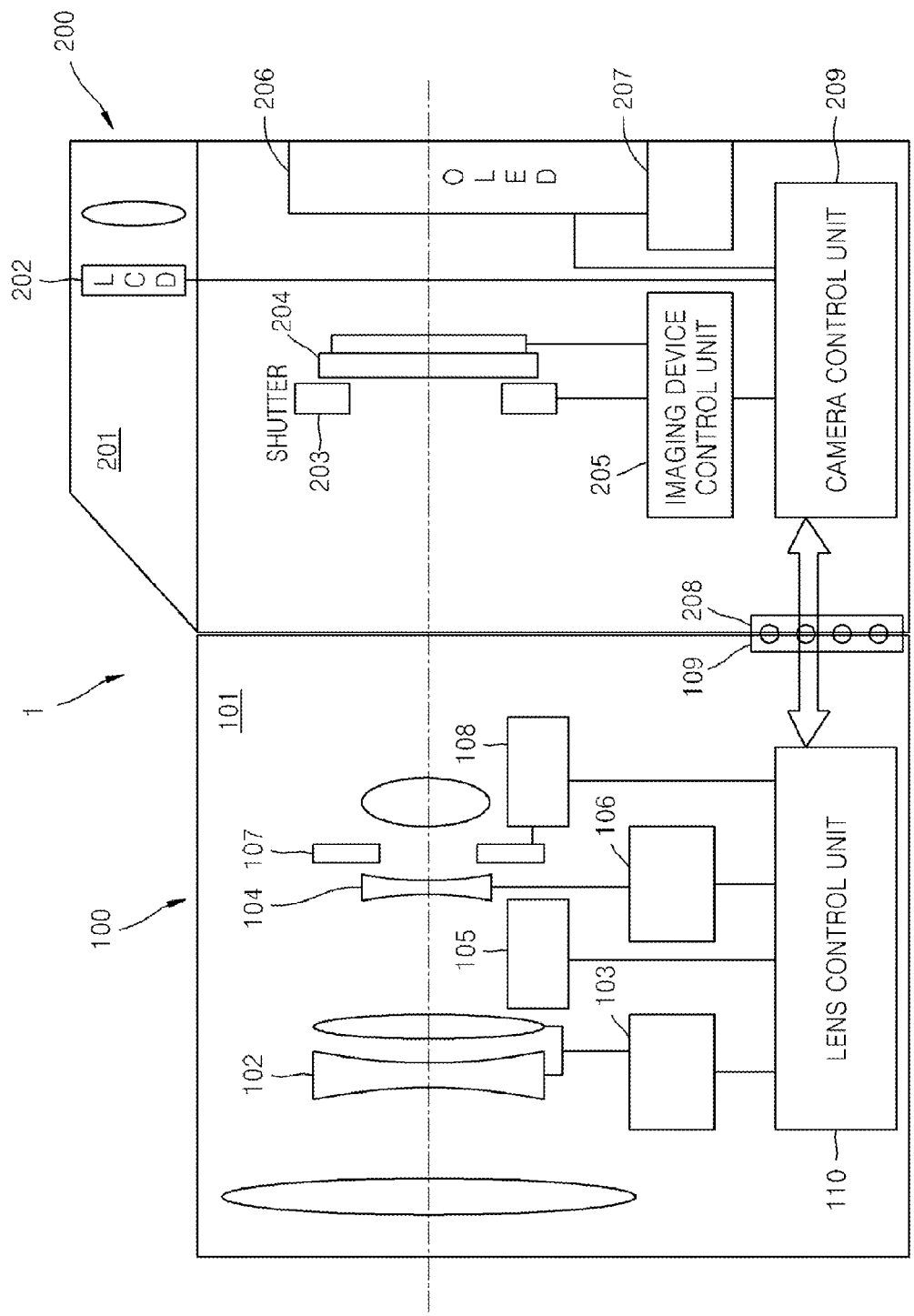
FIG. 1 is a block diagram illustrating a digital photographing apparatus according to an embodiment.

FIG. 1 is a block diagram illustrating a digital photographing apparatus 1 according to an embodiment.

Referring to FIG. 1, the digital photographing apparatus 1 of the present embodiment includes an exchangeable lens 100 (hereinafter referred to as a "lens") and a main body unit 200. The exchangeable lens 100 has a focus detection function. The main body unit 200 has a function of controlling the exchangeable lens 100 to drive a focus lens 104.

The lens 100 includes an imaging optical system 101, a zoom lens location detection sensor 103, a lens driving unit 105, a focus lens location detection sensor 106, an iris driving unit 108, a lens control unit 110, and a lens mount 109.

The imaging optical system 101 may include a zoom lens 102 for adjusting a zoom, a focus lens 104 for changing a focus location, and an iris 107. The zoom lens 102 and the focus lens 104 may be configured as a lens group including a plurality of lenses.

The zoom lens location detection sensor 103 and the focus lens location detection sensor 106 detect locations of the zoom lens 102 and the focus lens 104, respectively. A time for detecting the location of the focus lens 104 may be set by the lens control unit 110 or a camera control unit 209 that will be described later. For example, the time for detecting the location of the focus lens 104 may be a time at which a focus is detected from an image signal.

The lens driving unit 105 and the iris driving unit 108 are controlled by the lens control unit 110 and drive the focus lens 104 and the iris 107, respectively. In particular, the lens driving unit 105 drives the focus lens 104 in an axial direction.

The lens control unit 110 sends information regarding the detected location of the focus lens 104 to a main body unit 200. In this regard, if the location of the focus lens 104 changes, or if the camera control unit 209 requests the location information of the focus lens 104, the lens control unit 110 may send the location information of the focus lens 104 to the main body unit 200.

The lens mount 109 includes a lens size communication pin that is engaged with a camera side communication pin described later, and is used as a transmission path for a control signal. A construction of the main body unit 200 will now be described.

The main body unit 200 may include a view finder EVF 201, a shutter 203, an image pickup device 204, an imaging control unit 205, a display unit 206, a manipulation unit 207, a camera control unit 209, and a camera mount 208.

The view finder 201 may include a liquid crystal display (LCD) unit 202 and check an image in real time when capturing an image.

The shutter 203 determines a time at which light is applied to the imaging device 204, i.e., an exposure time.

The imaging device 204 generates the image signal by performing image processing on an optical signal passing through the imaging optical system 101 of the lens 100. The imaging device 204 may include a plurality of photoelectric conversion units arranged in a matrix form and a horizontal transmission path for moving electric charges from the photoelectric conversion units and deriving the image signal.

The imaging control unit 205 generates a timing signal and controls the imaging device 204 to perform imaging in sync with the timing signal. The imaging control unit 205 sequentially reads image signals if charges are completely accumulated in each scan line. The read image signals are used to detect the focus in the camera control unit 209.

The display unit 207 displays various images and information. The display unit 205 may use an organic light emitting diode (OLED), a LCD, or the like.

The manipulation unit 207 is a part for inputting various commands from a user to manipulate a digital photographing apparatus 1. The manipulation unit 207 may include various buttons such as a shutter release button, a main switch, a mode dial, a menu button, etc.

The camera control unit 209 detects focuses with respect to the image signals generated by the imaging device 204 and calculates focus evaluation values. The camera control unit 209 calculates and stores the focus evaluation values every focus detection time by using the timing signal generated by the imaging device control unit 205, and calculates a target location of the focus lens 104 from the location information of the focus lens 104 transmitted from the lens 100 and the stored focus evaluation values. A result of the calculated target location of the focus lens 104 is sent to the lens 100.

The camera mount 208 includes the camera side communication pin.

Hereinafter, schematic operations of the lens 100 and the main body unit 200 will be described.

When a subject is photographed, an operation of the digital photographing apparatus 1 is initiated by manipulating a main switch (MS) included in the manipulation unit 207. The digital photographing apparatus 1 performs the following operations to facilitate live view display.

An optical signal of the subject passing through the imaging optical system 101 is incident into the imaging device 204. In this regard, the shutter 203 is in an open state. The optical signal of the subject is converted into an electrical signal in the imaging device 204. An image signal is generated from the electrical signal. The imaging device 204 operates according to the timing signal generated by the imaging device control unit 205. The image signal of the subject is converted into displayable data in the camera control unit 209. The data is output to the view finder 201 and the display unit 206. Such operations facilitate the live view display. A live view image is continuously displayed through the live view display as a moving image.

After the live view display is performed, if the shutter release button included in the manipulation unit 207 is half-pressed, the digital photographing apparatus 1 initiates an auto focusing (AF) operation. The AF operation is performed by using the image signal generated by the imaging device 204. The lens 100 is driven based on a result obtained by calculating the target location of the focus lens 104 from a focus evaluation value related to a contrast value according to a contrast AF method. The focus evaluation value is calculated by the camera control unit 209. The camera control unit 209 calculates information used to control the focus lens 104 and sends the calculated information to the lens control unit 110 through the communication pins included in the lens mount 109 and the camera mount 208.

The lens control unit 110 performs the AF operation by controlling the lens driving unit 105 based on the received information and driving the focus lens 104 in the axial direction. The location of the focus lens 104 is monitored by the focus lens location detection sensor 106 and is fed back to the camera control unit 209.

If the zoom lens 102 is manipulated and zoomed by a user, the zoom lens location detection sensor 103 detects a location of the zoom lens 102, and the lens control unit 110 changes AF control parameters of the focus lens 104 and performs the AF operation again.

If an image of the subject is focused according to the operation described above, the digital photographing apparatus 1 performs an exposure operation by full-pressing the shutter release button (S2). In this regard, the camera control unit 209 fully closes the shutter 203 and receives photometry information acquired until now from the lens control unit 110 as iris control information. The lens control unit 110 controls the iris driving unit 108 based on the iris control information. The iris driving unit 108 drives the iris 107 to have an appropriate pressing value. The camera control unit 209 controls the shutter 203 based on the photometry information and opens the shutter 203 for an appropriate exposure period of time to perform photographing, and thus the image of the subject is captured.

The captured image on which image signal processing and compression processing are performed is stored in a memory card 212. Simultaneously, the captured image is output through the view finder 201 and the display unit 206. Such an image is referred to as a quick view image.

A series of photographing operations ends according to the process described above.

Figure 2:
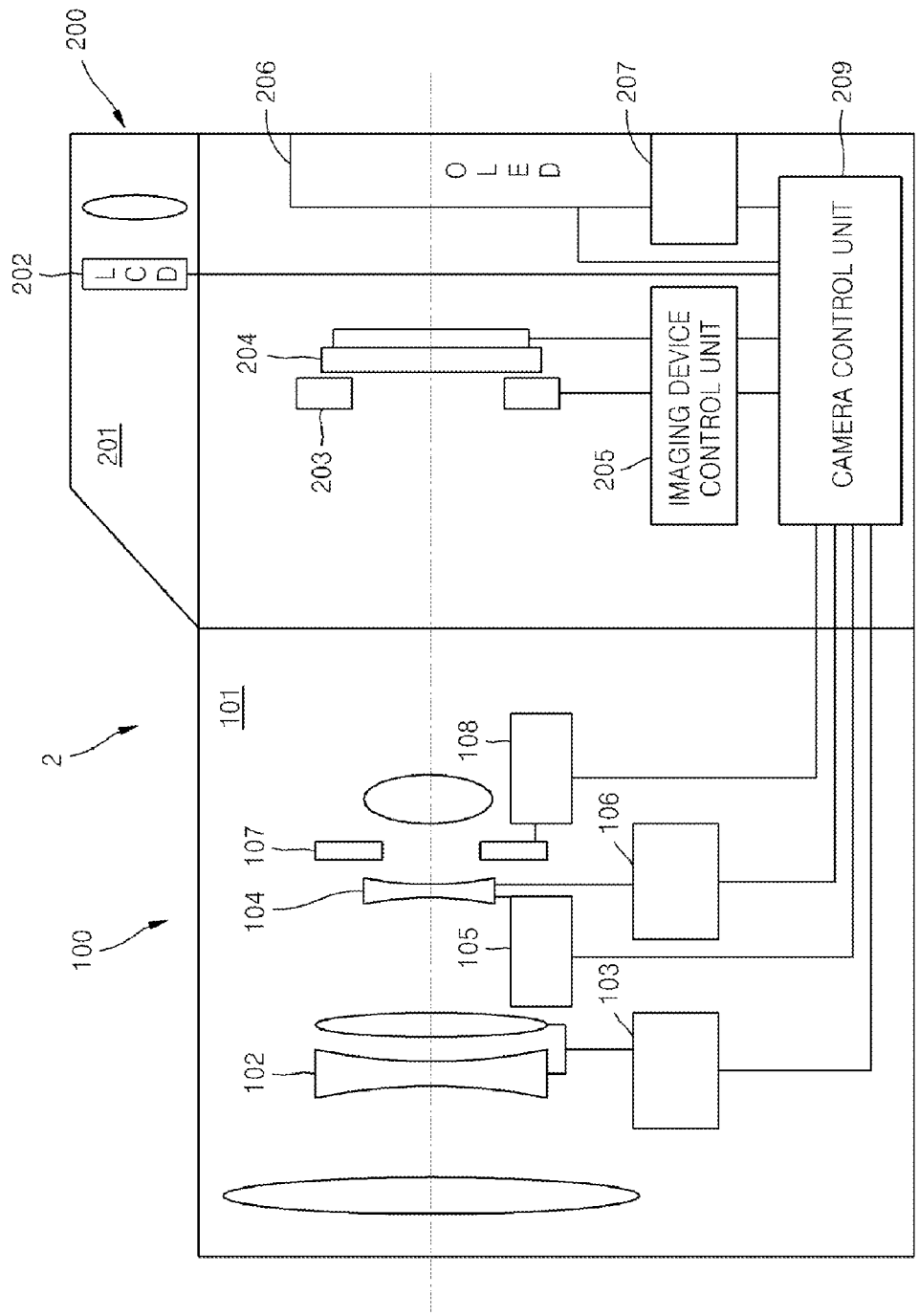
FIG. 2 is a block diagram illustrating a digital photographing apparatus according to another embodiment.

FIG. 2 is a block diagram illustrating a digital photographing apparatus 2 of an AF controlling apparatus according to another embodiment.

The digital photographing apparatus 2 of the present embodiment has a construction and function similar to those of the digital photographing apparatus 1 of FIG. 1 and thus only differences therebetween will now be described. The digital photographing apparatus 2 includes the lens 100 and the main body unit 200 which are integrally formed, and thus the lens 100 is non-exchangeable. Furthermore, the digital photographing apparatus 2 does not include the lens mount 109 and the camera mount 208 because of the integrally formed lens 100 and main body 200. Thus, the camera control unit 209 directly controls the lens driving unit 105, the iris driving unit 108, and the like. The camera control unit i209 may directly receive location information from the zoom lens location detection sensor 103 and the focus lens location detection sensor 106.

Figure 3:
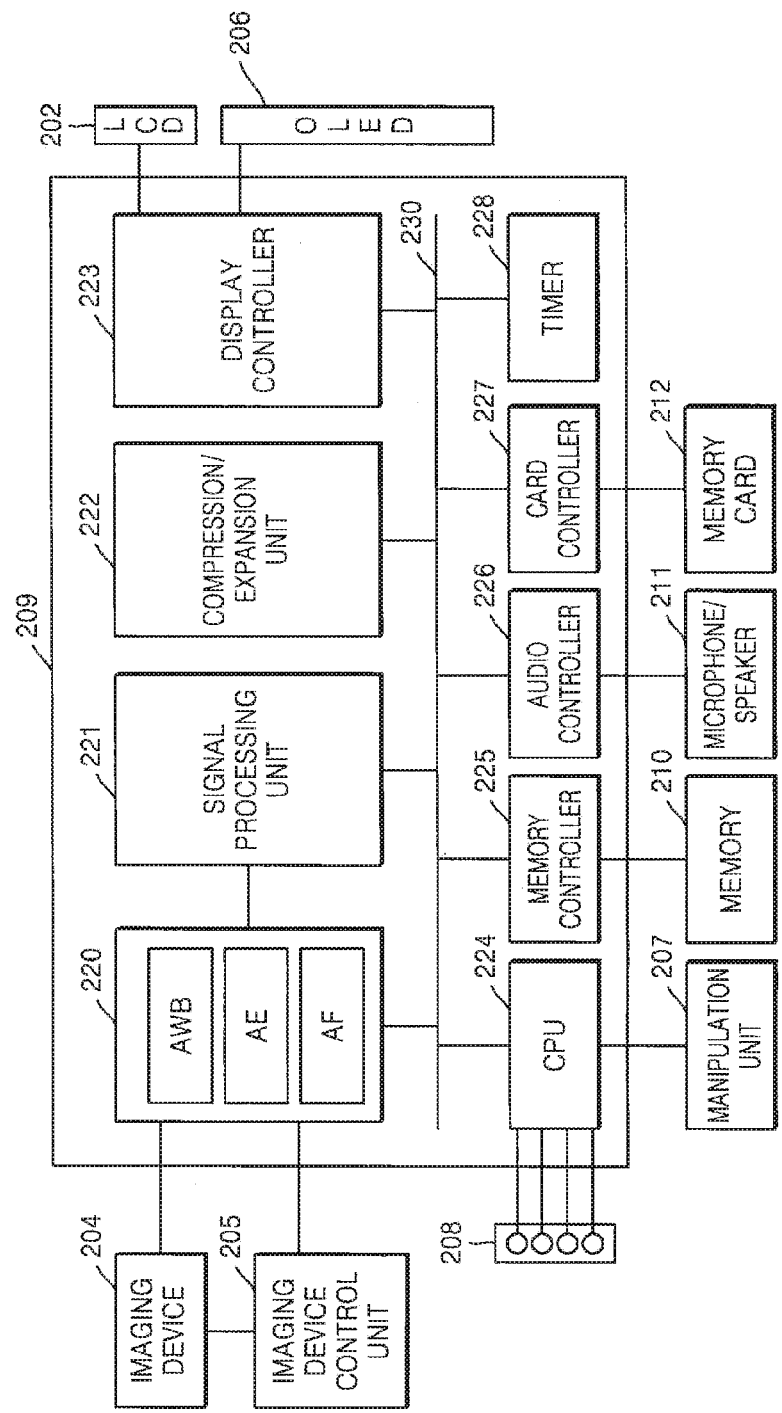
FIG. 3 is a block diagram illustrating a camera control unit of FIG. 1, according to an embodiment.

FIG. 3 is a block diagram illustrating the camera control unit 209 of the digital photographing apparatus 1 of FIG. 1.

Referring to FIG. 3, the camera control unit 209 of the present embodiment includes an advance processing unit 220, a signal processing unit 221, a compression/expansion unit 222, a display controller 23, a CPU 224, a memory controller 225, an audio controller 226, a card controller 227, a timer 228, and a main bus 230.

The camera control unit 209 sends various instructions and data to each element through the main bus 230.

The advance processing unit 220 receives an image signal generated by the imaging device 204 and performs arithmetic operations of auto white balance (AWB), auto exposure (AE), and AF. More specifically, the advance processing unit 220 includes an AF evaluation value calculation unit that calculates a focus evaluation value regarding a focus state from the image signal generated by the imaging device 204. The advance processing unit 220 further includes an AWB evaluation value calculation unit and an AE evaluation value calculation unit that calculate evaluation values for adjusting AWB and AE, respectively.

The signal processing unit 221 generates a live view image of a captured image, which is capable of being displayed on a display unit, by performing a series of image signal processing operations, such as gamma correction, etc.

The compression/expansion unit 222 compresses the image signal using a Joint Photographic Experts Group (JPEG) compression format or a H.264 compression format. An image file including image data generated by performing compression processing is transmitted and stored in the memory card 212.

The display controller 223 controls a display screen such as the LCD unit 202 or the display unit 206 of the view finder 201 to output an image.

The CPU 224 generally controls an operation of each element. In the digital photographing apparatus 1 of FIG. 1, the CPU 224 communicates with the lens 110.

The memory controller 225 controls a memory 210 that temporarily stores the captured image or data such as image information. The audio controller 226 controls a microphone or a speaker 211. The card controller 227 controls the memory card 212 that stores the captured image. The timer 228 measures a time period.

Figure 4A:
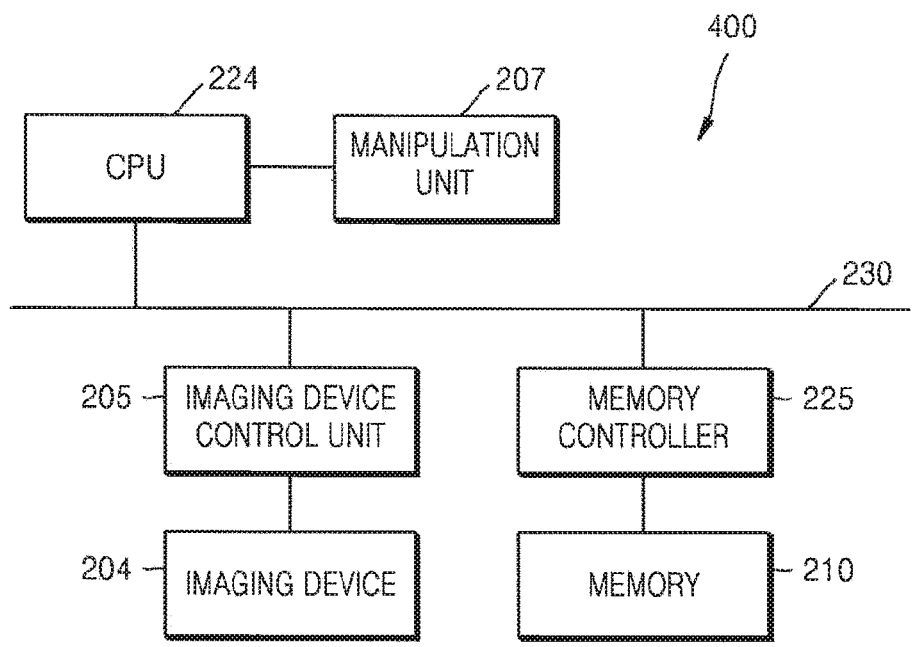
FIG. 4A is a block diagram illustrating a digital photographing apparatus for performing a continuous photographing function, according to an embodiment.

FIG. 4A is a block diagram illustrating a digital photographing apparatus 400 for performing a continuous photographing function according to an embodiment.

Referring to FIG. 4A, the digital photographing apparatus 400 of the present embodiment may include the CPU 224, the manipulation unit 207, the imaging device control unit 205, the imaging device 204, the memory controller 225, and the memory 210. The digital photographing apparatus 400 of FIG. 4A includes the elements for performing the continuous photographing function according to an embodiment among the elements shown in FIGS. 1 through 3, and the invention is not limited thereto.

The CPU 224 controls a general operation of the digital photographing apparatus 400, and can be identified herein as a control unit.

The manipulation unit 207 provides the CPU 224 with a continuous photographing start signal and a continuous photographing end signal that are input according to a user's continuous photographing instruction. In this regard, the continuous photographing start signal is generated by pressing a shutter release button, and the continuous photographing end signal is generated by releasing the shutter release button. Although continuous photographing starts and ends according to operations of pressing and releasing the shutter release button in the present embodiment, the invention is not limited thereto, and other manipulation methods can be used.

Figures 8, 9, 10:
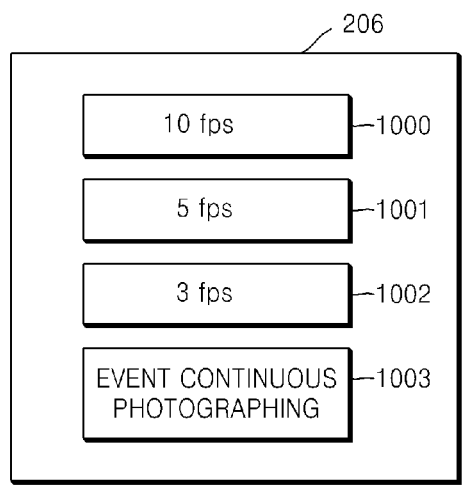
FIGS. 8 and 9 are tables for explaining a method of storing and deleting data of continuously captured images, according to an embodiment.
FIG. 10 is a block diagram for explaining an event continuous photographing mode according to an embodiment.

In the present embodiment, the manipulation unit 207 provides a user menu for continuous photographing. As shown in FIG. 10, the manipulation unit 207 may provide a menu relating to the continuous photographing function. Referring to FIG. 10, if a user selects continuous photographing, the manipulation unit 207 may provide menus for photographing according to a number of frames per second, i.e., 10 fps 1000, 5 fps 1001, and a 3 fps 1002, and a menu 1003 for event continuous photographing. In this regard, the menus 1000, 1001, and 1002 for photographing according to the number of frames per second define continuous photographing as frame numbers as set per second irrespective of a user's intention or an event period, whereas the menu 1003 for event continuous photographing defines continuous photographing in consideration of the user's intention or the event period. For example, photographing starts when a user presses the shutter release button, continues while the user is pressing the shutter release button, and ends when the user releases the shutter release button. In this regard, the event continuous photographing, but not necessarily limited to this term, must be understood to mean that continuous images desired by the user can be obtained by performing photographing according to a user's photographing intention, i.e., from a photographing start to a photographing end.

If a lot of image data is stored in a memory, i.e., a buffer, by performing continuous photographing as described above, or the buffer is overfilled, the image data stored in the buffer is selectively deleted, a buffer capacity is further secured, and image data obtained through continuous photographing is stored in a spare space of the buffer.

Selectively, photographing is performed during a photographing interval t1 when continuous photographing starts, and, if the spare space of the buffer is determined to be insufficient, photographing is performed during a photographing interval t2. In this regard, t2 is longer than t1. The spare space of the buffer may be determined to be insufficient when the spare space of the buffer is smaller than a first threshold. The first threshold may be optionally set as ½ or ⅓ of a total capacity of the buffer. As described above, if the spare space of the buffer is determined to be insufficient, or the buffer is overfilled, the photographing interval is adjusted as well as the image data stored in the buffer may be deleted according to a predetermine rule and image data obtained through continuous photographing may be stored in the buffer.

Figure 5:
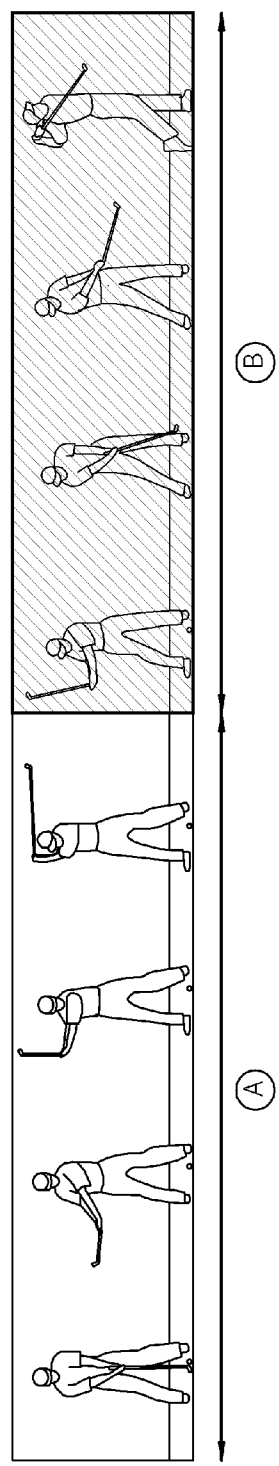
FIG. 5 is an image sequence diagram for explaining conventional continuous photographing.
Figures 6, 7:
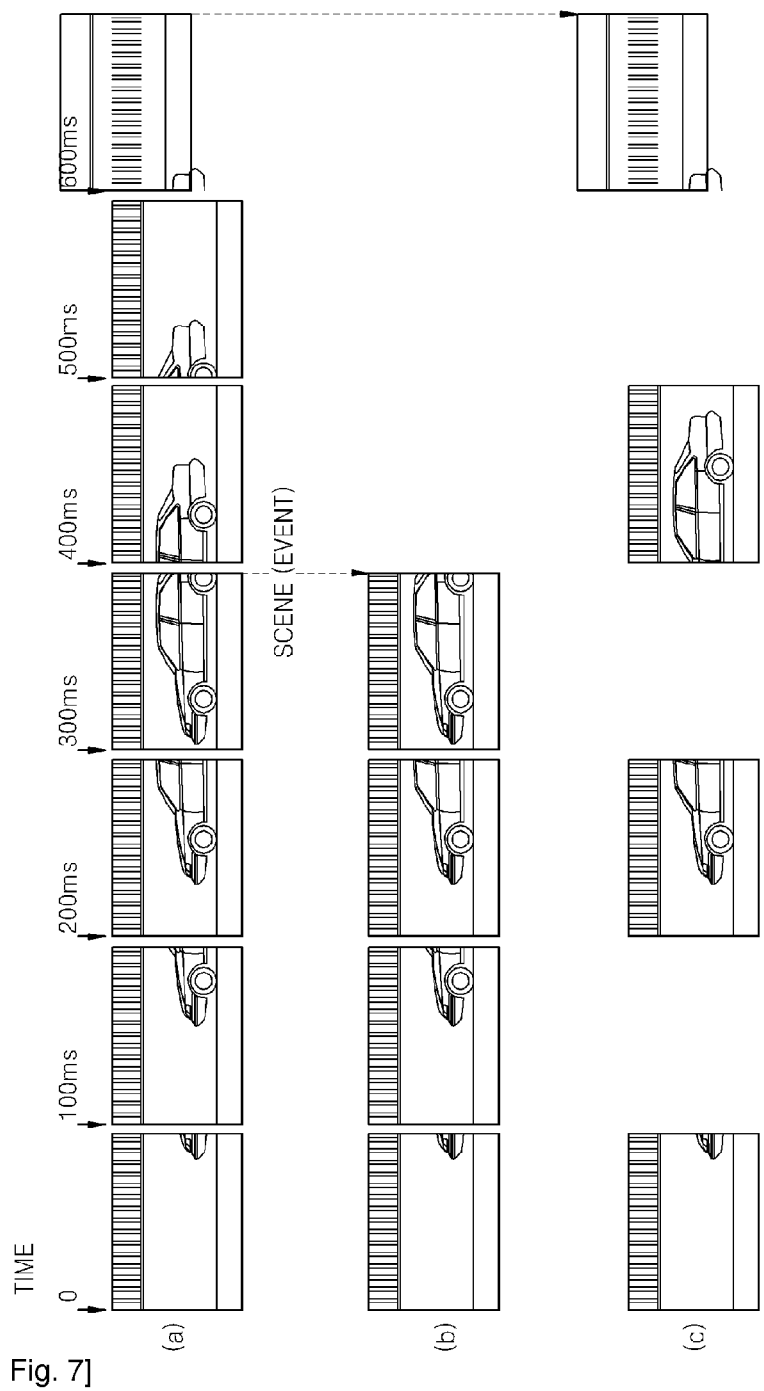
FIG. 7 is a table for explaining a conventional method of storing data of continuously captured images.

FIGS. 5 through 6C are diagrams for explaining conventional continuous photographing with event continuous photographing according to an embodiment.

FIG. 5 shows images obtained by continuously photographing a golf swing motion. In this regard, although a user's intention is a whole section from an address motion to a finish motion, or an event section, since continuous photographing is performed until a designated photographing number is expired or a user releases a button, photographing is no longer performed if the designated photographing number is expired although an event is not complete. That is, as shown in FIG. 5, continuous photographing ends in a section A and thus images of a section B are not photographed. Although high speed continuous photographing is quickly performed, since the amount of data of captured images increases, images of the section B are not captured due to a short continuous photographing continuance time as shown in FIG. 5. That is, images of a down swing motion, an impact motion, a release motion, and a finish motion desired by the user cannot be obtained.

FIG. 6A shows images obtained by continuously photographing a scene or an event in which a car passes by, i.e., the car appearing at 100 ms and passing by in 600 ms.

If continuous photographing is conventionally performed as shown in FIG. 6B, images before 400 ms are captured and images after 400 ms are not captured, whereas, if continuous photographing is performed according to an embodiment as shown in FIG. 6C, all images in a desired event section, i.e., the car appearing and passing by, can be obtained. In other words, conventional continuous photographing is performed from when the user presses a photographing button until a designated photographing number is expired or the user releases the photographing button, and photographing is no longer performed if the designated photographing number is expired although an event is not complete. However, the event continuous photographing according to an embodiment is performed from when the user presses the photographing button until the user releases the photographing button, and simultaneously, a storage space for captured images is secured and data of subsequently captured images is stored therein, and thus a whole event can be photographed.

The imaging device control unit 205 controls a photographing interval of the imaging device 204 and acquires data of continuously captured images. The data of continuously captured images acquired from the imaging device 204 are sequentially stored in the memory 210 through the memory controller 225 under control of the CPU 224. In this regard, the memory 210 is a buffer that is a space for temporarily storing the continuously captured images. The continuously captured images are stored in the memory 210 after image signal processing and advance processing are performed thereon as described with reference to FIGS. 1 through 3.

The CPU 224 controls the imaging device control unit 205 to photograph a subject during a first photographing interval according to a continuous photographing start signal provided from the manipulation unit 207. In this regard, the first photographing interval may be 100 ms or less. The CPU 224 sequentially stores the image data acquired during the photographing interval of, for example, 100 ms in the memory 210. Thereafter, although a continuous photographing end signal is not detected, if a storage space of the memory 210 is insufficient, a part of the image data stored in the memory 210 is deleted according to a predetermined rule. Then, the CPU 224 controls the memory 210 to store other image data therein until the continuous photographing end signal is detected from the manipulation unit 207. In this regard, the predetermined rule regarding selectively deleting the image data stored in the memory 210 will now be described with reference to FIGS. 7 through 9.

FIG. 7 shows a conventional sequence of storing data of continuously captured images in buffers. The data of continuously captured images are sequentially stored in buffers 0 through 9. If the buffers 0 through 9 are overfilled, the buffer 0 is empty and a $10^{th}$ image is stored in the empty buffer 0. In this way, if a buffer is overfilled, since a time taken to empty the buffer and store an image in the empty buffer is significantly shorter than a photographing time, as described with reference to FIGS. 5 through 6C, it is difficult to obtain a resultant of continuous photographing desired by the user.

Referring to FIGS. 8 and 9, if a buffer is overfilled, for example, 2n−1th images ($1^{st}$, $3^{rd}$, $5^{th}$, $7^{th}$, and $9^{th}$ images) are deleted from the buffer, and data of subsequently captured images is stored in an empty space of the buffer. For example, if the $9^{th}$ image is captured and the buffer is overfilled, the $1^{st}$ image that is the 2n−1th image is deleted from the buffer and a $10^{th}$ image is captured. Then, the $3^{rd}$ image is deleted from the buffer, and an $11^{th}$ image is captured. In this regard, an interval between continuously captured images is 2 t, $0^{th}$, $2^{nd}$, $4^{th}$, $6^{th}$, and $8^{th}$ images are substantially stored in the buffer, and $10^{th}$ through $14^{th}$ images are stored after the buffer is overfilled. In this regard, n is a positive integral number, corresponding data of captured images may be stored while the 2n−1th images are deleted from the buffer, or data of captured images may be sequentially stored after the 2n−1th images stored in the buffer are wholly deleted. Although the 2n−1th images are deleted, the invention is not limited thereto, and the 2n−1th images may be deleted in different ways in consideration of a time of continuous photographing or a size of the buffer.

Referring to FIG. 9, $0^{th}$ through $14^{th}$ images are captured and the buffer is overfilled again and then the 2n−1th images are deleted from the buffer, and a $15^{th}$ image is captured. The images stored in the buffer are rearranged in the order of $0^{th}$, $2^{nd}$, $4^{th}$, $6^{th}$, $8^{th}$, $10^{th}$, $11^{th}$, $12^{th}$, $13^{th}$, and $14^{th}$ images, the $2^{nd}$, $6^{th}$, $10^{th}$, $12^{th}$, and $14^{th}$ images that are 2n−1th images are deleted from the substantially stored images of FIG. 8, and $15^{th}$, $16^{th}$, $17^{th}$, $18^{th}$, and $19^{th}$ images are captured. In this regard, an interval of captured images is 3 t, and substantially stored images are the $0^{th}$, $4^{th}$, $8^{th}$, $11^{th}$, $13^{th}$, $15^{th}$, $16^{th}$, $17^{th}$, $18^{th}$, and $19^{th}$ images. Thus, all images in a continuous photographing section can be stored from a continuous photographing start time to a continuous photographing end time although a photographing interval slightly differs. Furthermore, high speed continuous photographing has a very short photographing interval of 100 ms or less, and thus the user has a difficulty in recognizing a difference in the photographing interval and disregards the difference.

If the storage space of the memory 210 is insufficient, the CPU 224 can control the imaging device control unit 205 to photograph the subject during a second photographing interval that is longer than a previously set first photographing interval. For example, if a capacity of a buffer is 50% remaining, the CPU 224 changes a given photographing interval of 100 ms to 200 ms, thereby preventing the buffer from quickly overfilling due to a plurality of pieces of data of continuously captured images. In this case, even after the photographing interval increases, if the storage space of the memory 210 is insufficient, as described with reference to FIGS. 8 and 9, images stored in the buffer are deleted or rearranged and then data of images captured until the continuous photographing end time may be stored in the buffer.

Figure 4B:
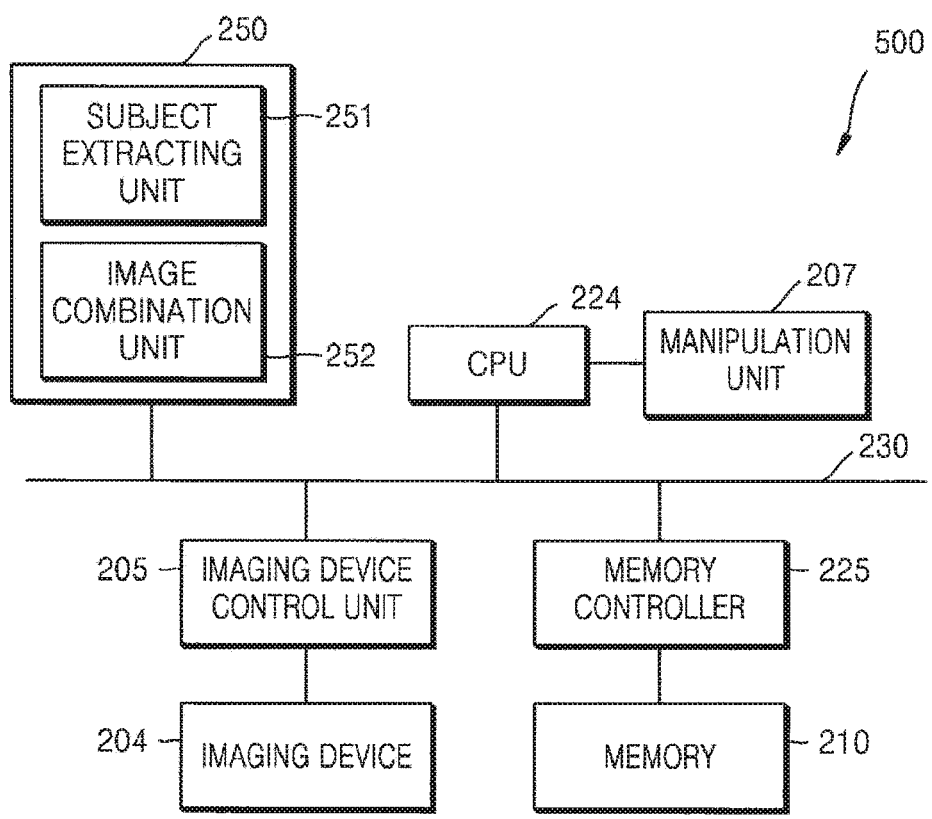
FIG. 4B is a block diagram illustrating a digital photographing apparatus for performing a continuous photographing function, according to another embodiment.

FIG. 4B is a block diagram illustrating a digital photographing apparatus 500 for performing a continuous photographing function according to another embodiment.

Referring to FIG. 4B, a description of the same construction as that shown in FIG. 4A is omitted, and only differences therebetween will now be described. The digital photographing apparatus 500 of FIG. 4B further includes a post processing unit 250 including a subject extracting unit 251 and an image combining unit 252.

The post processing unit 250 generates one image by performing post processing on plurality of pieces of image data stored in the memory 210. In this regard, one image includes an image obtained by extracting images of a main subject from continuously captured images and combining the extracted images, or an image obtained by extracting images of a dynamic subject and combining the extracted images. That is, one continuous photographing image is generated by extracting a core subject, for example a moving person, or a dynamic subject, for example, a car that is moving, from continuously captured images by reflecting a user's intention of continuous photographing.

The subject extracting unit 251 extracts a main subject from data of continuously captured and stored images. In this regard, an extraction of a subject includes an extraction of a main subject or a dynamic subject. The extraction of the main subject may include an extraction of a subject corresponding to a foreground between extracted foreground and background, or an extraction of a figure or a face. In this regard, although the main subject is extracted using the methods described above, the invention is not limited thereto, and various technologies may be used to extract the main subject.

The subject extracting unit 251 extracts the dynamic subject from data of continuously captured and stored images. The dynamic subject is extracted by detecting a moving part in the continuous image data among the data of continuously captured and stored images. In this regard, the moving part may be detected by detecting a movement of a subject in consideration of a size and direction of a motion vector of each piece of image data or by calculating a difference between previous and subsequent image data, i.e., a differential image. In this regard, although the dynamic subject is extracted using the methods described above, the invention is not limited thereto, and various technologies may be used to extract the dynamic subject.

Figure 13:
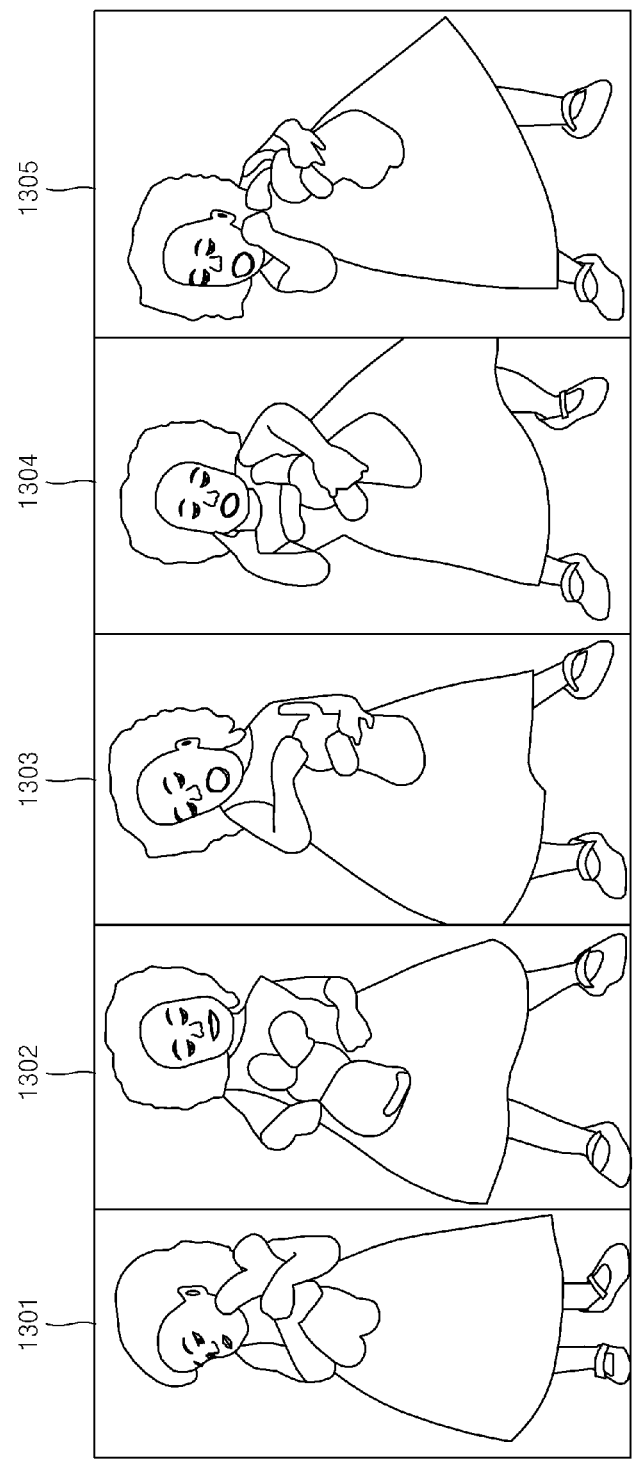
FIG. 13 is an image sequence diagram for explaining continuous photographing post processing, according to an embodiment.

The image combining unit 252 generates one continuous photographing image using image data corresponding to the main subject extracted by the subject extracting unit 251. FIG. 13 shows one continuous photographing image obtained by extracting images 1301 to 1305 of the main subject from data of continuously captured images, and combining the extracted images 1301 to 1305. That is, one image is generated by cropping a main or interest subject of continuously captured images, thereby providing continuous photographing images from a start and end of an event in accordance with a photographing event other than a continuous photographing time interval.

Figure 14:
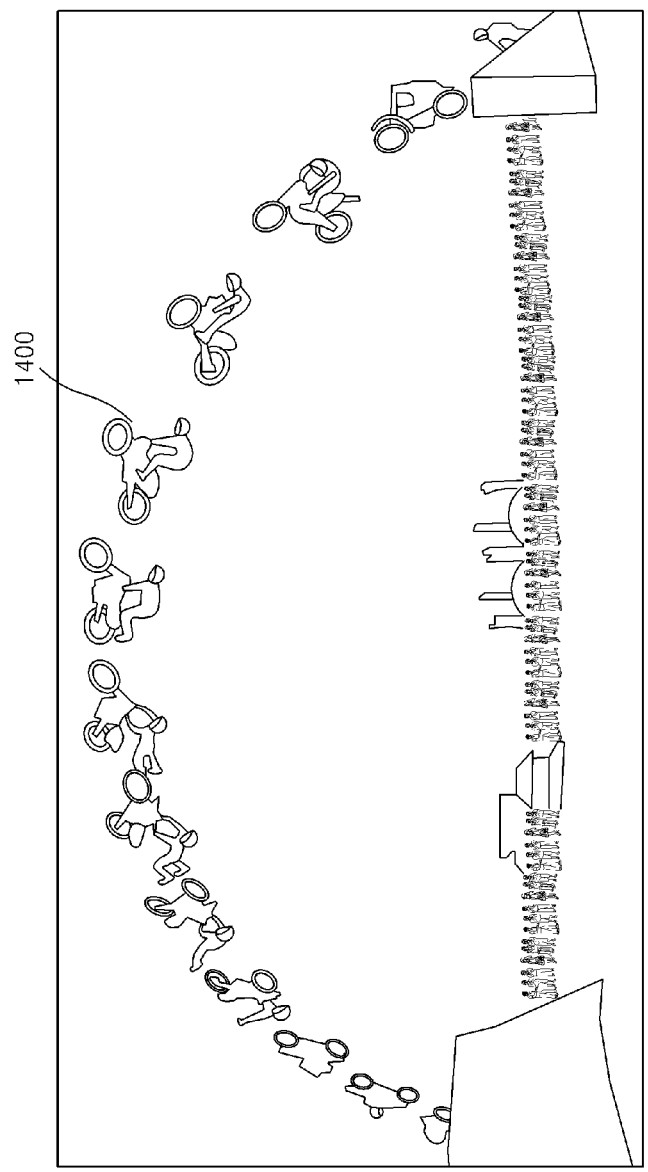
FIG. 14 is an image sequence diagram for explaining continuous photographing post processing according to another embodiment.

The image combining unit 252 generates one continuous photographing image using image data corresponding to the dynamic subject extracted by the subject extracting unit 251. FIG. 14 shows one continuous photographing image obtained by extracting dynamic subjects 1400 from data of continuously captured images, and combining the extracted dynamic subjects 1400. That is, one image is generated by extracting the dynamic subject that is a main target of continuous photographing from continuously captured images, thereby easily providing an image in accordance with a user's intention or target.

Figure 11:
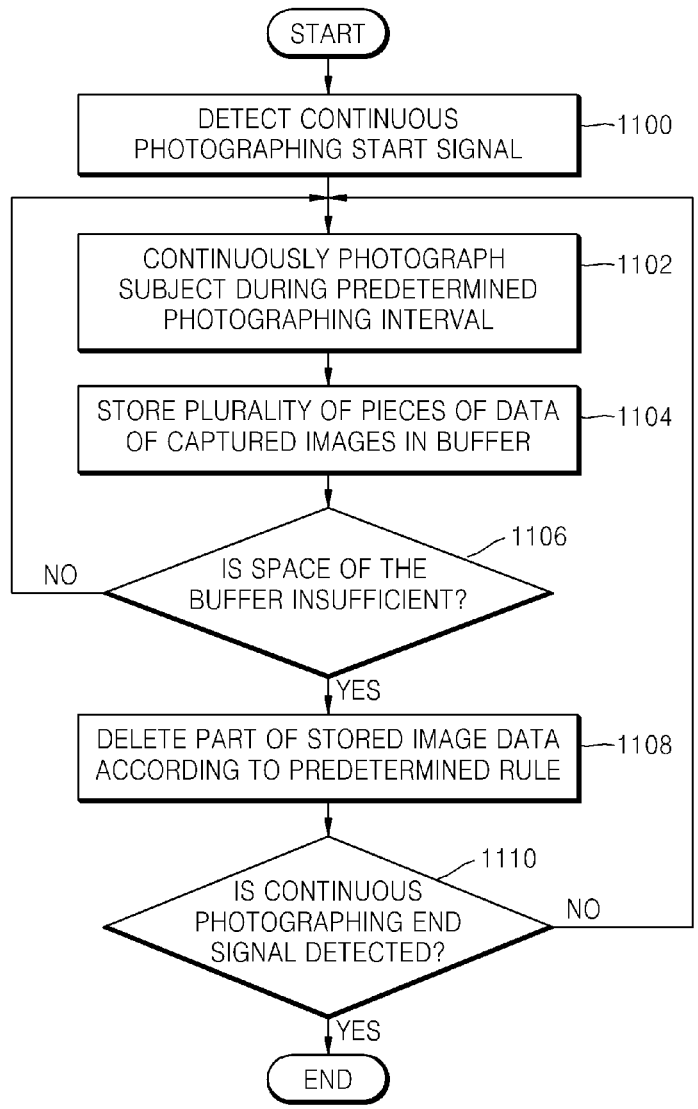
FIG. 11 is a flowchart for explaining a method of controlling continuous photographing performed by a digital photographing apparatus, according to an embodiment.

FIG. 11 is a flowchart for explaining a method of controlling continuous photographing performed by a digital photographing apparatus according to an embodiment.

Referring to FIG. 11, in operation 1100, a continuous photographing start signal is detected. In operation 1102, a subject is continuously photographed during a predetermined photographing interval. In this regard, the photographing interval may be determined in advance according to a user's selection or may be provided as default according to a performance of an imaging device or the digital photographing apparatus.

In operation 1104, a plurality of data of captured images is stored in a buffer. In operation 1106, it is determined whether a space of the buffer is insufficient. That is, if images are captured at 10 frames per second, and a capacity of the buffer is 30 frames, additionally captured images cannot be stored in the buffer after 3 seconds or after images stored in the buffer are deleted. Thus, in the present embodiment, it is determined that the space of the buffer is insufficient, in operation 1108, a part of the image data is deleted according to a predetermined rule. In this regard, the rule is to delete images stored in the buffer during a uniform interval. For example, 2n−1th images are sequentially deleted. In operation 1110, if a continuous photographing end signal is detected, continuous photographing ends. If the continuous photographing end signal is not detected, operations 1102 and 1104 to 1108 are repeatedly performed. In this regard, although operation 1110 is performed after operation 1108, operation 1110 may be performed before operation 1108. Furthermore, although continuous photographing is controlled in the order of continuous photographing, storing, deleting, photographing, and storing, this is for convenience of understanding, and deleting of the space of the buffer and storing of images in the buffer may be repeatedly performed while continuous photographing is performed, or data of images photographed after the buffer is overfilled may be sequentially stored while being sequentially deleted.

Figure 12:
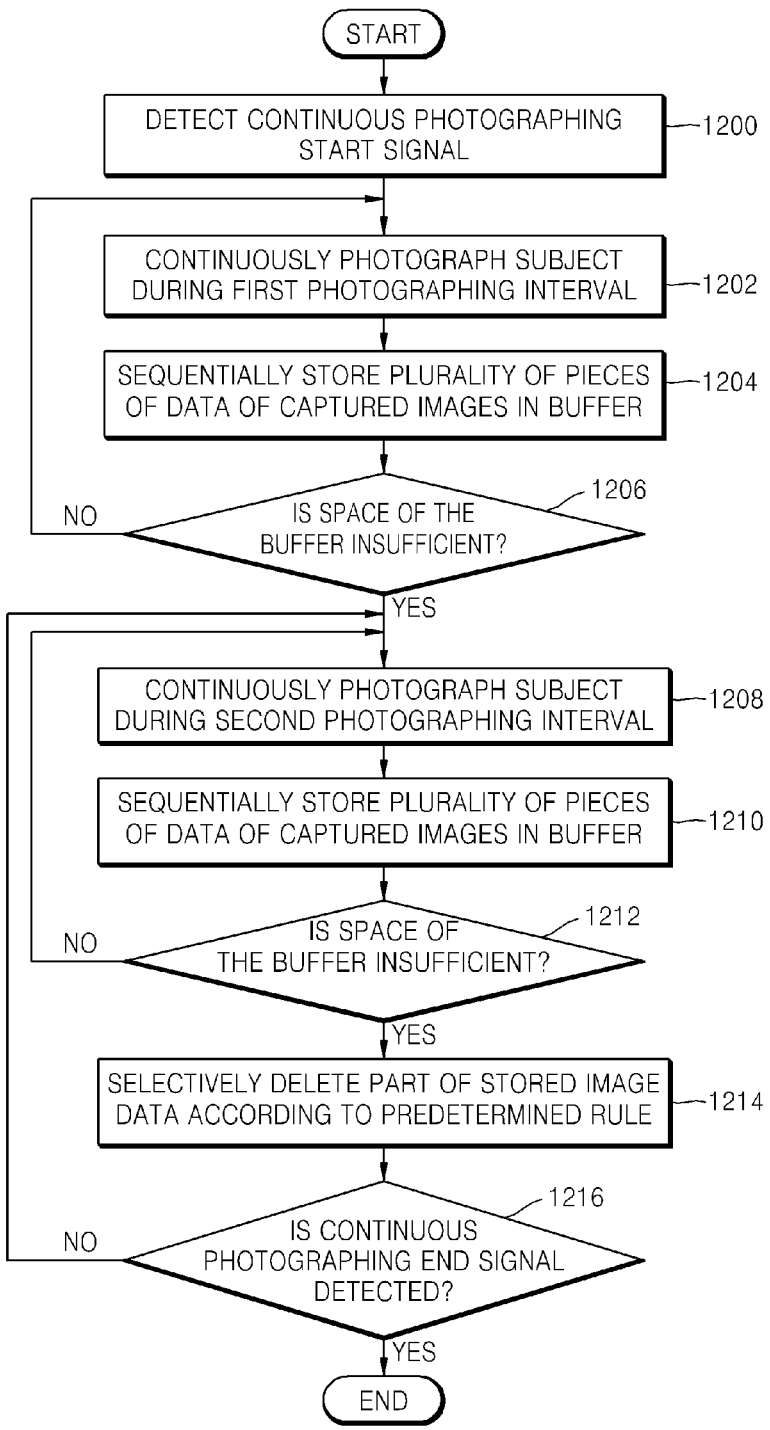
FIG. 12 is a flowchart for explaining a method of controlling continuous photographing performed by a digital photographing apparatus, according to another embodiment.

FIG. 12 is a flowchart for explaining a method of controlling continuous photographing performed by a digital photographing apparatus according to another embodiment.

Referring to FIG. 12, in operation 1200, a continuous photographing start signal is detected. In operation 1202, a subject is continuously photographed during a first photographing interval. For example, the first photographing interval is 100 ms. In operation 1204, a plurality of data of captured images is stored in a buffer.

In operation 1206, if a space of the buffer is insufficient, operation 1208 is performed, and, if not, operation 1202 is performed. If the space of the buffer is not overfilled in operation 1206, 40% of 50% of a whole capacity of the buffer is remaining.

In operation 1208, the subject is continuously photographed during a second photographing interval. In this regard, the second photographing interval is 200 ms that is longer than the first photographing interval of operation 1202. In operation 1210, a plurality of data of captured images is stored in the buffer.

In operation 1212, if the space of the buffer is insufficient, in operation 1214, a part of the data of captured images stored in the buffer is deleted according to a predetermined rule. It is determined that the space of the buffer is insufficient when the buffer is overfilled or the data of captured images is no longer stored in the buffer. In this regard, a rule to delete the data of captured images stored in the buffer is the same as described with reference to FIG. 11. That is, the image data stored in the buffer is deleted during a uniform interval. For example, 2n−1hth images are deleted.

In operation 1216, if a continuous photographing end signal is not detected, operation 1208 is performed, and the plurality of data of captured images of operation 1208 is stored in the empty space of the buffer of operation 1214.

According to the method of controlling continuous photographing performed by the digital photographing apparatus, continuous photographing can be achieved according to a user's intention without causing inconvenience for a user during continuous photographing, and a desired event can be photographed from its start to end rather than during a precisely given interval.

The device described herein may comprise a processor, a memory for storing program data and executing it, a permanent storage such as a disk drive, a communications port for handling communications with external devices, and user interface devices, such as a display, keys, etc. When software modules are involved, these software modules may be stored as program instructions or computer readable codes executable by the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by a computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that may be executed in one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation to the scope of the invention unless otherwise claimed. Numerous modifications and adaptations will be readily apparent to those of ordinary skill in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the invention.

The invention claimed is:

1. A method of controlling continuous photographing performed by a digital electronic apparatus, the method comprising:

photographing a subject during a first photographing interval according to a continuous photographing start signal;

storing a plurality of pieces of image captured during the first photographing interval in a buffer;

performing a first check to determine if a storage space of the buffer is insufficient;

if the storage space of the buffer is insufficient according to the first check, photographing the subject during a second photographing interval that is longer than the first photographing interval and sequentially storing a plurality of pieces of image captured during the second photographing interval in the buffer;

performing a second check to determine if storage space is insufficient;

if the storage space of the buffer is insufficient according to the second check, deleting a part of the plurality of pieces of image data stored in the buffer according to a predetermined rule; and storing the plurality of pieces of image data stored in the storage space of the buffer from which the part of the image data is deleted until a continuous photographing end signal is detected, wherein deleting of the space of the buffer and storing of images in the buffer is performed in one of two ways according to a predetermined rule:

(1) repeatedly deleting of the space of the buffer and storing of images in the buffer while continuous photographing is performed, and (2) sequentially storing data of images photographed after the buffer is overfilled while buffer space is sequentially deleted.

2. The method of claim 1, further comprising:

if a storage space of a buffer is insufficient, photographing the subject during a second photographing interval that is longer than the first photographing interval.

3. The method of claim 1, wherein the deleting comprises:
deleting data of 2n−1th images from the plurality of pieces of image data stored in the buffer, wherein n is a positive integer.

4. The method of claim 1, wherein the deleting further comprises:
if the storage space of the buffer is smaller than a first threshold, photographing the subject during the second photographing interval that is longer than the first photographing interval; and
deleting the 2n−1th image data from the plurality of pieces of image data that are captured during the first photographing interval and the second photographing interval and is stored in the buffer, wherein n is a positive integer.

5. The method of claim 4, further comprising:
storing the plurality of pieces of image data captured during the second photographing interval in the storage space of the buffer from which the part of the image data is deleted.

6. The method of claim 1, further comprising:
selecting an event continuous photographing mode in which image data, which is obtained by photographing an event of the subject that occurs from the continuous photographing start signal to the continuous photographing end signal, is stored.

7. The method of claim 1, further comprising:
generating one image by performing post processing on the stored plurality of pieces of image data.

8. The method of claim 7, wherein the generating comprises:
extracting image data corresponding to a main subject from the stored plurality of pieces of image data; and
generating one continuous photographing image corresponding to the main subject from the extracted image data.

9. The method of claim 7, wherein the generating further comprises:
extracting image data corresponding to a dynamic subject from the stored plurality of pieces of image data; and
generating one continuous photographing image corresponding to the dynamic subject from the extracted image data.

10. A method of controlling continuous photographing performed by a digital electronic apparatus, the method comprising:
photographing a subject during a first photographing interval according to a continuous photographing start signal;
sequentially storing a plurality of pieces of image data captured during the first photographing interval in a buffer;
performing a first check to determine if storage space of the buffer is smaller than a first threshold;
if a storage space of the buffer is smaller than a first threshold according to the first check, photographing the subject during a second photographing interval that is longer than the first photographing interval;
sequentially storing a plurality of pieces of image data captured during the second photographing interval in the buffer;
performing a second check to determine if storage space is insufficient;
if the storage space of the buffer is insufficient according to the second check, deleting a part of the plurality of pieces of image data stored in the buffer; and
storing the plurality of pieces of image data stored in the storage space of the buffer from which the part of the image data is deleted until a continuous photographing end signal is detected,
wherein deleting of the space of the buffer and storing of images in the buffer is performed in one of two ways according to a predetermined rule:
(1) repeatedly deleting of the space of the buffer and storing of images in the buffer while continuous photographing is performed, and
(2) sequentially storing data of images photographed after the buffer is overfilled while buffer space is sequentially deleted.

11. The method of claim 10, wherein the deleting comprises:
deleting data of 2n−1th images from the plurality of pieces of image data stored in the buffer, wherein n is a positive integer.

12. A non-transitory computer program product, comprising a computer usable medium having a computer readable program code embodied therein, said computer readable program code adapted to be executed to implement a method for controlling continuous photographing performed by a digital electronic apparatus, said method comprising:
photographing a subject during a first photographing interval according to a continuous photographing start signal;
storing a plurality of pieces of image captured during the first photographing interval in a buffer;
performing a first check to determine if a storage space of the buffer is insufficient;
if the storage space of the buffer is insufficient according to the first check, photographing the subject during a second photographing interval that is longer than the first photographing interval and sequentially storing a plurality of pieces of image captured the second photographing interval in the buffer;
performing a second check to determine if storage space is insufficient
if storage space of the buffer is insufficient according to the second check, deleting a part of the plurality of pieces of image data stored in the buffer according to a predetermined rule; and
storing the plurality of pieces of image data stored in the storage space of the buffer from which the part of the image data is deleted until a continuous photographing end signal is detected,
wherein deleting of the space of the buffer and storing of images in the buffer is performed in one of two ways according to a predetermined rule:
(1) repeatedly deleting of the space of the buffer and storing of images in the buffer while continuous photographing is performed, and
(2) sequentially storing data of images photographed after the buffer is overfilled while buffer space is sequentially deleted.

13. A digital electronic apparatus comprising:
an imaging device control unit for photographing a subject;
a buffer for storing a plurality of pieces of image data; and
a control unit for:
controlling the imaging device control unit to photograph the subject during a first photographing interval according to a continuous photographing start signal,
storing a plurality of pieces of image data captured during the first photographing interval in a buffer,
performing a first check to determine if a storage space of the buffer is insufficient, if the storage space of the buffer is insufficient according to the first check, photographing the subject during a second photographing interval that is longer than the first photographing interval and sequentially storing a plurality of pieces of image captured during the second photographing interval in the buffer, performing a second check to determine if the storage space is insufficient, if the storage space of the buffer is insufficient according to the second check, deleting a part of the plurality of pieces of image data stored in the buffer according to a predetermined rule, and storing the plurality of pieces of image data stored in the storage space of the buffer from which the part of the image data is deleted until a continuous photographing end signal is detected, wherein deleting of the space of the buffer and storing of images in the buffer is performed in one of two ways according to a predetermined rule:
  (1) repeatedly deleting of the space of the buffer and storing of images in the buffer while continuous photographing is performed, and
  (2) sequentially storing data of images photographed after the buffer is overfilled while buffer space is sequentially deleted.

14. The apparatus of claim 13, wherein, if a storage space of a buffer is insufficient, the control unit controls the imaging device control unit to photograph the subject during a second photographing interval that is longer than the first photographing interval.

15. The apparatus of claim 13, wherein the control unit controls deleting of data of 2n−1th images from the plurality of pieces of image data stored in the buffer, wherein n is a positive integer.

16. The apparatus of claim 13, wherein, if the storage space of the buffer is smaller than a first threshold, the control unit controls the imaging device control unit to photograph the subject during the second photographing interval that is longer than the first photographing interval and delete the 2n−1th image data from the plurality of pieces of image data that are captured during the first photographing interval and the second photographing interval and is stored in the buffer, wherein n is a positive integer.

17. The apparatus of claim 16, wherein the control unit controls to store the plurality of pieces of image data captured during the second photographing interval in the storage space of the buffer from which the part of the image data is deleted.

18. The apparatus of claim 13, further comprising:
an event continuous photographing mode selecting unit for storing image data obtained by photographing an event of the subject, which occurs from the continuous photographing start signal to the continuous photographing end signal.

19. The apparatus of claim 13, further comprising:
a post processing unit for generating one image by performing post processing on the stored plurality of pieces of image data.

20. The apparatus of claim 19, wherein the post processing unit comprises:
a subject extracting unit for extracting image data corresponding to a main subject from the stored plurality of pieces of image data; and
an image combining unit for generating one continuous photographing image corresponding to the main subject from the extracted image data.

21. The apparatus of claim 19, wherein the post processing unit comprises:
a subject extracting unit for extracting image data corresponding to a dynamic subject from the stored plurality of pieces of image data; and
an image combining unit for generating one continuous photographing image corresponding to the dynamic subject from the extracted image data.

\* \* \* \* \*